United States Patent
Perez et al.

(10) Patent No.: US 9,115,273 B2
(45) Date of Patent: Aug. 25, 2015

(54) COMPOSITION FOR LOW SMOKE, FLAME RETARDANT, HALOGEN-FREE, THERMOPLASTIC INSULATION SHOWING GOOD ELECTRICAL, PROPERTIES IN WATER

(76) Inventors: Miguel Angel Millan Perez, Querétaro (MX); Luis Vazquez Estrada, Querétaro (MX); Octavio Parra Tabla, Querétaro (MX); Alfonso Perez Sanchez, Querétaro (MX)

( * ) Notice: Subject to any disclaimer, the term of this patent is extended or adjusted under 35 U.S.C. 154(b) by 188 days.

(21) Appl. No.: 13/569,798

(22) Filed: Aug. 8, 2012

(65) Prior Publication Data

US 2013/0220667 A1  Aug. 29, 2013

(30) Foreign Application Priority Data

Nov. 4, 2011  (MX) .................... MX/a/2011/011705

(51) Int. Cl.
| | |
|---|---|
| *C08L 23/02* | (2006.01) |
| *C08L 51/00* | (2006.01) |
| *C08L 33/02* | (2006.01) |
| *C08L 31/04* | (2006.01) |
| *C08L 33/08* | (2006.01) |
| *C08L 83/04* | (2006.01) |
| *H01B 3/30* | (2006.01) |
| *C08L 23/08* | (2006.01) |
| *C08L 23/16* | (2006.01) |
| *H01B 3/44* | (2006.01) |

(52) U.S. Cl.
CPC ................ *C08L 23/02* (2013.01); *C08L 23/08* (2013.01); *C08L 23/16* (2013.01); *C08L 31/04* (2013.01); *C08L 33/02* (2013.01); *C08L 33/08* (2013.01); *C08L 51/003* (2013.01); *C08L 83/04* (2013.01); *H01B 3/30* (2013.01); *H01B 3/441* (2013.01); *H01B 3/447* (2013.01); *H01B 3/448* (2013.01); *C08L 2201/02* (2013.01)

(58) Field of Classification Search
CPC ..... H01B 3/447; H01B 3/448; C08L 2201/02
USPC .................................... 174/120 SR
See application file for complete search history.

(56) References Cited

U.S. PATENT DOCUMENTS

| 4,261,413 A | 4/1981 | Blower et al. |
|---|---|---|
| 4,396,730 A * | 8/1983 | Imahashi ...................... 523/200 |

(Continued)

FOREIGN PATENT DOCUMENTS

| CN | 101319079 A * | 12/2008 |
|---|---|---|
| EP | 0393959 | 10/1990 |

(Continued)

*Primary Examiner* — William H Mayo, III
*Assistant Examiner* — Krystal Robinson
(74) *Attorney, Agent, or Firm* — Carmen Pili Ekstrom

(57) ABSTRACT

A development of a polyolefin-based composition for manufacturing halogen-free, flame retardant, low smoke emission, thermoplastic insulations for use in electrical conductor cables, applied as insulation, that can be processed at high speed in the equipment used for its application. The composition being a mixture of at least two polyolefin-based polymer resins, which are a first soft and flexible resin and a second and heat-resistance provider resin; at least one compatibilizing and coupling agent; at least one flame retardant; at least one antioxidant; at least one lubricant and optionally at least one nanometric clay.

33 Claims, 2 Drawing Sheets

(56) References Cited

U.S. PATENT DOCUMENTS

| | | | |
|---|---|---|---|
| 4,424,330 A | | 1/1984 | Raviola |
| 4,522,994 A | | 6/1985 | Chiba |
| 4,892,683 A | | 1/1990 | Naseem |
| 5,063,266 A | * | 11/1991 | McRae ............... 524/269 |
| 5,863,963 A | | 1/1999 | Narang et al. |
| 5,912,436 A | * | 6/1999 | Sanchez et al. ........ 174/121 A |
| 6,087,428 A | | 7/2000 | Kohler |
| 6,287,692 B1 | * | 9/2001 | Luo et al. ............... 428/379 |
| 6,492,453 B1 | | 12/2002 | Ebrahimian et al. |
| 6,552,112 B1 | * | 4/2003 | Redondo et al. ........ 524/436 |
| 6,828,022 B2 | | 12/2004 | Bisleri et al. |
| 7,078,452 B2 | | 7/2006 | Ebrahimian et al. |
| 7,125,924 B2 | | 10/2006 | Credali et al. |
| 2002/0099116 A1 | * | 7/2002 | Nodera et al. ........... 524/127 |
| 2004/0127630 A1 | | 7/2004 | Herbiet |
| 2007/0072961 A1 | * | 3/2007 | Ma et al. ............... 523/205 |
| 2008/0300370 A1 | | 12/2008 | Lynch et al. |
| 2009/0326157 A1 | | 12/2009 | Fujiwara et al. |

FOREIGN PATENT DOCUMENTS

| | | |
|---|---|---|
| EP | 1288970 | 3/2003 |
| EP | 1990808 | 11/2008 |
| WO | WO8903409 | 4/1989 |
| WO | WO2007130407 | 11/2007 |
| WO | WO2008147494 | 12/2008 |

* cited by examiner

COMPOSITION FOR LOW SMOKE, FLAME RETARDANT, HALOGEN-FREE, THERMOPLASTIC INSULATION SHOWING GOOD ELECTRICAL, PROPERTIES IN WATER

FIELD OF THE INVENTION

The present invention relates to techniques for manufacturing electrical insulating materials for the building industry. More specifically, it relates to a composition for manufacturing flame retardant, halogen-free thermoplastic insulations, with low smoke emission in case of fire and good electrical properties in water immersion tests.

BACKGROUND OF THE INVENTION

In the last years, there has been a process of change in the requirements and specifications for low and medium voltage cables for works and installations in the building industry that, because of their characteristics and uses, require a high fire safety level. This process started when, after intensive studies, it was observed that a large number of fire-related deaths, either in houses, buildings or industrial installations were caused by smoke emissions generated by the combustion of products such as electrical conductor insulation materials. With regard to the importance of this problem, statistics show that over 80% of the victims of fires die because of smoke intoxication.

Commonly, polyvinyl chloride (PVC)-based plastic compounds have been used as insulation material for low voltage electrical conductors because of their low cost and excellent flame-retardant effect that can be enhanced by additives, among them polybrominated compounds such as the ones described in patents WO/1989/003409 and U.S. Pat. No. 4,892,683A1, antimony trioxide, as described in U.S. Pat. No. 5,863,963, or even metal hydroxides such as the ones described in U.S. Pat. No. 6,087,428A1. However, because it is a resin that includes at least one halogen such as chlorine in its chemical structure, it has some undesirable characteristics when burned, i.e., the generation of dark and dense gases, as well as, the release of hydrochloric acid. Moreover, the presence of chlorine in its molecule limits its heat resistance to a service temperature not higher than 105° C.

The above has motivated the search for the development of halogen-free alternative materials. In this sense, efforts have been made to produce materials emitting low smoke levels as described in U.S. Pat. No. 5,912,436A. Despite all these efforts, the problem has not been solved satisfactorily. There is still a need for developing cables with insulations showing a low generation of smoke and toxic gases during combustion, maintaining good electrical thermal insulation properties, as well as, a good flame retardant behavior. However, faced with the continuous need of reducing combustion toxic gases at the lowest possible levels, it is necessary to take into account the use of other polymeric materials allowing a better performance.

Thus, polyolefins (HDPE, LLDPE, PP, etc.) are a good option to substitute PVC, because, compared to it, they show lesser smoke emission, better electrical properties and are more environment-friendly. On the other hand, polyolefins show limited UV light resistance, a low resistance to oxidation and, because of their nature, a low flame resistance and thus require the use of large quantities of mineral fillers to improve their performance. The problem becomes critical if we take into account that most of the polyolefins have a limited capacity to accept mineral fillers and when their content is increased within the polyolefin, a reduction of mechanical properties is observed.

Among polymers showing low smoke generation during combustion, polyolefins are to be mentioned. Polyolefins are polymers that are less reactive because they are formed by saturated carbohydrate and because their macromolecules are not chemically bound together, except in crosslinked products. Because of this characteristic, the polyolefin polymers that have had a good application in the insulation of electrical conductors are polyethylene, as described in US Patent Publication 20080300370 and WO2008147494; the homopolymer polypropylene described in patents U.S. Pat. No. 4,522,994 and U.S. Pat. No. 6,919,410B2; the copolymer described in US Patent Publication 20090326157A1; patents JP 4-261413A and U.S. Pat. No. 4,424,330. On the other hand, the disadvantages shown by the polyolefins as pure resins are lack of flame resistance and, in most of them, a low capacity to accept mineral fillers that give them flame resistance property. Another problem that needs to be taken into account when working with polyolefins is their high sensitivity to oxidative degradation caused by ultraviolet light (UV) and the oxygen, which becomes more obvious in the case of polypropylene and its copolymers.

In order to try to solve the abovementioned problems, various additives have been used in the formulation of polyolefin-based compounds to obtain the characteristics required for processing them and for their performance as a finished product. Many other works conducted with polyolefins have been focused on integrating more than 100 parts per hundred of resin (phr) of mineral fillers, maintaining elongations at rupture above 100%, as described in U.S. Pat. No. 7,125,924B2 and US Patent Publication 20040127630, or in compounds that use coupling agents enhancing the compatibility between polymer and mineral filler as described in document WO2007/130407A1. Some other developments such as the ones described in U.S. Pat. No. 6,492,453 and U.S. Pat. No. 7,078,452B2 combine, besides the coupling agent, the use of mineral nanofillers to make flame retardant articles.

Other works have been focused on the development of flame retardant systems that can be used in smaller concentrations than metal hydroxide. Thus, systems based on acrylic polymer combinations, silicon compounds and calcium carbonate have been produced, the level of use of which are below 100 phr as described in patent EP0393959A2.

With regard to the application of polyolefin-based electrical insulation in cables, the development of flame retardant products with the addition of vinylsilane to the polyolefin composition and then crosslinked through moisture has also been explored, as described in patent EP1288970A1. In some applications, such as insulation for thin wall automotive cable and to fulfill water immersion electrical tests, new nitrogen-phosphorus-based flame retardant have been developed with good results, as well as, some tetraoxaspiro-type compounds to form fire inert material, that even meet the requirements of standards such as ISO6722, as described in patent EP1990808A3. It is very complex to obtain good electrical insulation in long term tests in moist environment and good flame resistance properties within the same compound. For this reason, some developments such as the one protected by U.S. Pat. No. 6,828,022B2 have considered the design of an electrical conductor with two insulating layers, a moisture resistant layer and a flame retardant layer.

With regard to the development of polymer formulations for use as insulations for electrical cables, the reduction of the mechanical properties is not the main problem of incorporating flame retardant mineral fillers to the polyolefins. There is a greater complexity related to the reduction of the electrical properties of the compound in cables immersed in water during several days.

In short, it is highly complex to develop a cable having a polyolefin-based, halogen-free, thermoplastic insulation compound that combines, as a finished product, the characteristics of a service thermal class −40° C. to 105° C., very low smoke emission, high flame resistance measured as FV2 vertical flame test (VW-1), high resistance to fire propagation, good electrical properties in water immersion tests during several days and good processability when applied through the extrusion process in the manufacturing of the cable.

BRIEF DESCRIPTION OF THE INVENTION

As a result of the above, the object of the present invention has been to solve the problem existing in the state of the art and to develop a composition for manufacturing flame retardant, halogen-free thermoplastic insulations, with low smoke emission and good electrical properties in water immersion tests for manufacturing cables.

The development of a new flame retardant, halogen-free thermoplastic polymer material, with low smoke emission and good electrical properties during its application requires a formulation that perfectly balances all its components and the additives used, because the enhancement of some of its characteristics should not have a negative effect on its overall performance.

The present invention describes the development of a polyolefin-based composition for manufacturing halogen-free, flame retardant, low smoke emission thermoplastic insulations showing good electrical properties in water, for use as insulation in a low voltage electrical conductor cable, up to 1000 V, meeting the requirements of European directive RoHS (Restriction of Hazardous Substances) that limits the presence of heavy metals and applicable in the building industry under description thermoplastic heat water resistant-low smoke/high heat water-resistant-low smoke (THW-LS/THHW-LS). Besides offering the abovementioned features, the insulation composition also shows good characteristics during the extrusion process allowing high speed processing in cable manufacturing.

Specifically, the composition for manufacturing flame retardant, low smoke emission, halogen-free thermoplastic insulators showing good electric properties in water of the present invention comprises in parts per hundred of resin (phr):

a) a mixture of at least two polyolefin-based polymer resins, comprising from about 5 to about 95 phr of a first soft and flexible resin and from about 5 to about 95 phr of a second tensile strength and heat-resistance provider resin;

b) from about 0.2 to about 50 phr of at least one compatibilizing and/or coupling agent;

c) from about 40 to about 270 phr of at least one flame retardant, using in a first embodiment from about 120 to about 250 phr of micrometric or nanometric metal hydroxides or, combination thereof; in a second embodiment, a combination of from about 10 to about 60 phr of calcium carbonate, from about 30 to about 80 phr of magnesium hydroxide, from about 5 to about 20 phr of silicon compounds and from about 20 to about 60 phr of EVA (polyethylene vinyl acetate) or acrylic-type polymer resins; and, in a third embodiment, from about 40 to about 100 phr of a mixture of nitrogen and phosphorus flame retardants;

d) from about 0.1 to about 15 phr of at least one antioxidant; and e) from about 0.2 to about 5 phr of at least one lubricant.

In an additional embodiment, the composition of the present invention includes from about 1 to about 20 phr of at least one nanometric clay for enhancing fire resistance properties.

The soft and flexible resin of the mixture of at least two polymer resins is selected from polyethylene vinyl acetate (EVA), polyethylene butyl acrylate (EBA), polyethylene ethyl acrylate (EEA), polyethylene methyl acrylate (EMA), linear low density polyethylene (LLDPE) and ethylene propylene copolymers (EP) that can include α olefins having the general formula $CH_2=CH-R$, wherein R is an alkyl, alkenyl or alkynyl which can contain from about 1 to 10 carbons that can be copolymerized or mixed among them.

The tensile strength and heat-resistance provider resin of the mixture of at least two polymer resins is selected from high density polyethylene (HDPE), polypropylene (PP) and ethylene-propylene copolymers (EP).

The compatibilizing and/or coupling agent is selected from maleic anhydride grafted in polymer materials, such as polyethylene (PE), polypropylene (PP) or ethylene-propylene copolymers (EP); moreover, Polyethylene-Acrylic Acids resins can also be used. On the other hand, the enhancement of the compatibility between resins and flame retardant fillers can also be obtained using silane-, zirconate- or titanate-type chemical additives.

As flame retardant elements, micrometric or nanometric metal hydroxides are mainly used, or combinations thereof, combinations of calcium carbonate and metal hydroxides, as well as, nitrogen and phosphorous mixtures.

Together with the flame retardant elements, nanoclays acting synergistically with the flame retardant elements can be used to lower the concentrations of said flame retardant elements and thus enhance the flow properties of the compound. The antioxidant selection depends on the selected polymer or polymers mixture.

Because it is critical for thermal stability properties, good results have been obtained with phenol-, aromatic amine-, phenol-amine-, thioester-, organophosphate- and metal deactivating-type antioxidants.

OBJECT OF THE INVENTION

Taking into account the disadvantages and limitations of the state of the art, it is an object of the present invention to provide a composition for manufacturing halogen-free, flame retardant thermoplastic insulations.

It is a further object of the present invention to provide a composition for manufacturing a halogen-free thermoplastic insulation having a low smoke emission in case of fire.

It is a further object of the present invention to provide a composition for manufacturing a halogen-free thermoplastic insulation showing good electric properties when immersed in water.

It is a further object of the present invention to provide a composition for manufacturing a halogen-free, flame retardant, low smoke emission thermoplastic insulation, showing good electrical properties in water, with combustion gases emitted in case of fire showing considerably lower toxicity because said composition is halogen-free.

A further object of the present invention is to provide a composition for manufacturing a halogen-free, flame retardant, low smoke emission thermoplastic insulation, showing good electrical properties in water, that can be processed practically and simply during the manufacturing of electrical conductor insulation.

A further object of the present invention is to provide a composition for manufacturing a halogen-free, flame retardant, low smoke emission thermoplastic insulation, showing good electrical properties in water for use as electrical conductors having excellent electrical properties and high flame resistance, as well as, a low smoke emission free from halogenated compounds in case of fire.

The above objects, as well as, other objects and advantages of the present invention are obtained through the formulation of a halogen-free, flame retardant, low smoke emission in case of fire, thermoplastic insulating composition showing good electrical properties when immersed in water.

The composition of the present invention comprises: a mixture of at least two polyolefin-based polymer resins; at least one compatibilizing and/or coupling agent; at least one flame retardant; at least one antioxidant; and at least one lubricant. Optionally, the composition may include nanometric clay for enhancing its fire resistance properties.

BRIEF DESCRIPTION OF THE FIGURES

The novel aspects considered characteristic of the present invention will be particularly pointed out in the attached claims. However, the advantages of other objects of the present invention shall be better understood through the following detailed description of a specific embodiment in combination with the attached drawings, wherein:

DETAILED DESCRIPTION OF THE INVENTION

Definitions

Figure 1:
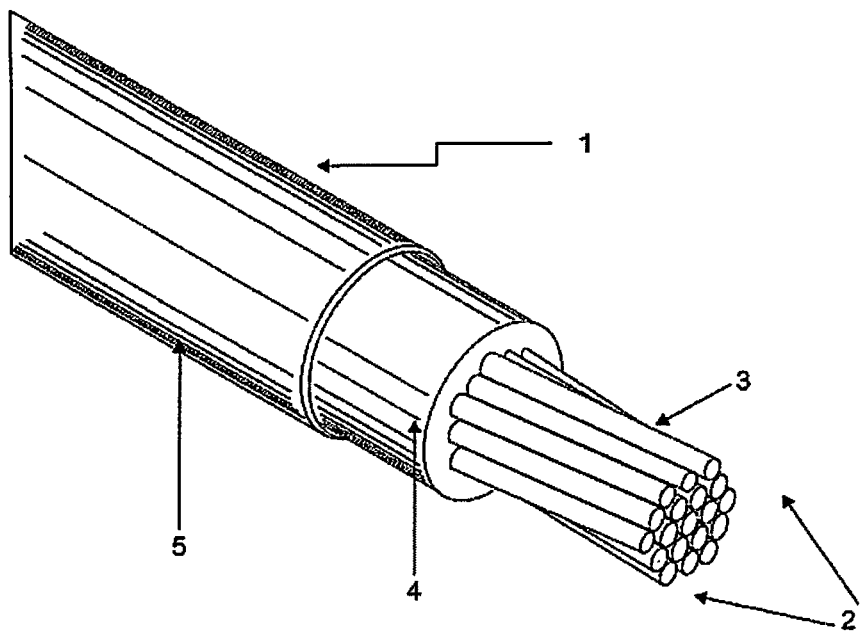
FIG. 1 is a perspective view of a low voltage electrical conductor cable with double insulating layer, manufactured with the composition of the present invention, which includes a cross-section to show the structural details of the cable.

Unless defined otherwise, all technical and scientific terms used herein have the same meaning as is commonly understood by one of ordinary skill in the art. All patents, applications, published applications and other publications are incorporated by reference in their entirety. In the event that there are a plurality of definitions for a term herein, those in this section prevail unless stated otherwise.

As used herein "about" refers to at least approximately or reasonably close to. The presence of a component in the compound composition depends on the part of the component per hundred parts of resin.

The term "halogen free" refers to the composition being substantially free of "halogen" which includes fluorine, bromine, chlorine, or iodine. Halogen free cables are engineered and designed so that emissions during a fire offer low toxicity and low smoke.

The term "flame-retardant" is any appropriate substance that is applied to a combustible material to suppress the flame. Flame retardants are chemicals used in thermoplastics that inhibit or resist the spread of fire.

The term "fire resistant" refers to a property of a substance other than water that reduces flammability of fuels or delays their combustion. In the event of a fire within a commercial, residential or other structures, e.g., buildings, homes, public buildings, and facilities, the hazard of a fire would be greatly exacerbated where the insulation layer enrobing an electrical current conducting wire were to burn or melt off, and thereby expose the wire to contact with an alternate current path.

Nanometric clay has been added to improve fire resistance. Various fire retardant additives include organic materials in conjunction with antimony oxides. While such additives provide good fire resistance, these additives frequently need be present in relatively high concentrations, typically up to 20% of the organic material, and up to 5% of an antimony oxide. A further additive known to impart good fire retardant behavior is red phosphorous which is found to be effective in compositions at concentrations as low as 20% by weight. However, both these additive systems are also known to suffer drawbacks. Both systems are known to decrease the flexural and elongation properties of the compositions of which they are a constituent. Where a composition having an ultimate elongation higher than 100% would be considered to be highly desirable, and be particularly useful in forming part of a flexible structure well suited for insulating electrical current conductors, the use of such types of additives are also known to substantially reduce the ultimate elongation and other flexural characteristics of compositions of which they comprise a part. Additionally, red phosphorous is known to impart a deep color to compositions which is also frequently undesirable.

The term "low smoke emission" refers to a property of the insulating composition wherein the amount of toxic and corrosive gas emitted during combustion is at a minimum due to the absence of halogen and heavy metals. The emission of halogenated acid gas is below 0.1% by weight, measured according to NMX-J-472 or IEC-60754-1.

The term "sun light resistant" refers to a property that protects the insulating composition against ultraviolet (UV) light, oxygen and moisture. The addition of UV protectors such as titanium dioxide, benzotriazole, benzophenone, carbon black, and hindered amine light stabilizers.

The term "good electrical property" in water immersion test refers to the electrical performance of insulation even after long term water immersion as shown by the water absorption electric method (EMA test) according to NMX-J-040 and UL-2556 (capacitance and relative permittivity). The insulated cable is a product that has a long service life. Wires and cables for electric power applications in particular are often used outdoors for long periods, where they are constantly exposed to sunlight, wind and rain. The long-term properties of the insulated cables were evaluated under conditions emulating severe environment.

As used herein, compounds which are "commercially available" may be obtained from standard commercial sources including Dupont, Lyondell Basell, Degussa, Crosspolimeri, Condor, Borealis, Dow Chemical, etc.

As used herein, "methods known to one of ordinary skill in the art" may be identified through various reference books and databases. Suitable reference books and treatise that detail the synthesis of reactants useful in the preparation of compounds of the present invention, or provide references to articles that describe the preparation, include for example, "Synthetic Organic Chemistry", John Wiley & Sons, Inc., New York; S. R. Sandier et al., "Organic Functional Group Preparations," 2nd Ed., Academic Press, New York, 1983; H. O. House, "Modern Synthetic Reactions", 2nd Ed., W. A. Benjamin, Inc. Menlo Park, Calif. 1972; T. L. Gilchrist, "Heterocyclic Chemistry", 2nd Ed., John Wiley & Sons, New York, 1992; J. March, "Advanced Organic Chemistry: Reactions, Mechanisms and Structure", 4th Ed., Wiley-Interscience, New York, 1992; C. Wikie et al., "Fire Retardancy of Polymeric Materials", 2nd Ed., CRC-Press, 2009; J. Leng et al., "Multifunctional Polymer Nanocomposites", 1st Ed., CRC-Press, 2010. Specific and analogous reactants may also be identified through the indices of known chemicals prepared by the Chemical Abstract Service of the American Chemical Society, which are available in most public and university libraries, as well as through on-line databases (the American Chemical Society, Washington, D.C. may be contacted for more details). Chemicals that are known but not commercially available in catalogs may be prepared by custom chemical synthesis houses, where many of the standard chemical supply houses (e.g., those listed above) provide custom synthesis services.

It has been surprisingly found that the compositions of the present invention, developed for manufacturing a thermoplastic insulation for low voltage electrical conductors show, when submitted to emergency conditions, such as during a fire, a very low emission of smoke, high flame resistance and high resistance to fire propagation, besides presenting good electrical properties in tests of water immersion during several days and good processing properties during the extrusion process.

The formulations developed for manufacturing thermoplastic insulations for low voltage electrical conductors show a perfect balance between all their components and additives. It is for this reason that the formulation found, besides enhancing the characteristics of its components, does not negatively affect the performance of any of them.

The present invention describes the development of polyolefin-based, halogen-free, flame retardant, low emission of smoke, thermoplastic compositions showing good electrical properties in water, for use as insulating material in low voltage electrical conductor cables (up to 1000 V), that meet the requirements of European Directive RoHS and can be applicable in the building industry under the description THW-LS/THHW-LS (building-type wire). The compositions of the present invention, applied as insulation, besides showing the above mentioned features, show good characteristics during the extrusion process, permitting high speed processing in the equipment used for its application.

The composition for manufacturing halogen-free, flame retardant, low smoke emission, thermoplastic insulations showing good electrical properties in water of the present invention comprises, in parts per hundred of resin (phr):

a) a mixture of at least two polyolefin-based polymer resins, comprising from about 5 to about 95 phr of a first soft and flexible resin, and from about 5 to about 95 phr of a second tensile strength and heat-resistant provider resin;

b) from about 0.2 to about 50 phr of at least one compatibilizing and/or coupling agent;

c) from about 40 to about 270 phr of at least one flame retardant;

d) from about 0.1 to about 15 phr of at least one antioxidant; and e) from about 0.2 to about 5 phr of at least one lubricant.

It is important to mention that in one additional embodiment, the composition for manufacturing halogen-free thermoplastic insulations of the present invention includes at least one nanometric clay in a range from about 1 to about 20 phr, for enhancing fire resistance properties.

Now then, with regard to the flame retardant, in a first embodiment, the composition comprises from about 120 to about 250 phr of micrometric or nanometric particle metal hydroxides, or combinations thereof; a second embodiment comprises a combination of from about 10 to about 60 phr of calcium carbonate, from about 30 to about 80 phr of magnesium hydroxide, from about 5 to about 20 phr of silicon compounds and from about 20 to about 60 phr of EVA-type polymer resins or acrylic polymers; and a third embodiment comprises from about 40 to about 100 phr of nitrogen and phosphorus flame retardant mixtures.

With regard to the polyolefin-based polymer resins, the appropriate resin selection is critical in the formulation because the thermal class, mechanical properties, electrical properties, filler acceptation level and processability depend to a great extent on it.

In many of the cases and given the user's current performance requirements and the electric sector standards, it is necessary to work with combinations of two or more polymer resins. This is the reason why the combination of at least two polymer resins was considered, a first soft and flexible resin and a second tensile strength and heat-resistant provider resin.

The soft and flexible resin allows the good incorporation of flame retardant additives in the compound, and offers good mechanical properties at room temperature showing elongation at rupture higher than 200%, as well as in cold conditions, showing good cold bend properties at −40° C.

The selected resins belong to the polyethylene vinyl acetate (EVA) type with various concentrations of vinyl acetate (VA) and various Melt Flow Indexes (MFI), such as Elvax 265 (28% VA and MFI ranging from 2.6 to 3.4) and Elvax 170 (36% VA and MFI of 0.9) from DuPont; Evatene 2803 (28% VA and MFI ranging from 3.0 to 4.5) from Arkema; polyethylene butyl acrylate (EBA) type with various concentrations of butyl acrylate (BA) such as Lotryl 17BA04 (BA ranging from 16 to 19% and MFI ranging from 3.5 to 4.5) from Arkema, Elvaloy 3427 AC (BA 27% and MFI 4) from DuPont; polyethylene ethyl acrylate (EEA) type with various concentrations of ethyl acrylate (EA) such as Elvaloy 2116 AC (16% EA and MFI 1.0) from Arkema; polyethylene methyl acrylate (EMA) type with various concentrations of methylacrylate (MA) such as Lotryl 29MA03 (MA ranging from 27 to 31% and MFI ranging from 2 to 3.5) from Arkema and; Elvaloy 1224 AC (MA 24% and MFI 2.0) from DuPont; lineal low density polyethylene (LLDPE) type having various melting points (MP) such as Engage 8450 (MFI 3 and MP 97° C.), 8440 (MFI 1.3 and MP 93° C.) and 8452 (MFI 3 and MP 66° C.) all of them from DuPont; ethylene-propylene (EP) copolymers type such as Buna EP T 2070 (MFI ranging from 1.1 to 1.7) from Lanxess; and copolymers that can include α olefins having the general formula $CH_2=CH-R$, wherein R is an alkyl, alkenyl or alkynyl which can contain from about 1 to 10 carbons, that can be copolymerized or mixed among them, such as Softell CA 02A (MFI 0.6 and MP 141° C.) from Lyondell Basell.

The content of this type of resins within the formulation ranges from about 5 to about 95 phr, preferably from about 10 to about 90 phr, using either one or several of them in combination.

The second polymer resin conferring to the compound voltage- and heat-resistance in heat distortion tests, abrasion resistance and besides good sliding characteristics is selected from high density polyethylene (HDPE) such as HD-6706 (MFI 6.7 and MP 132° C.) and HD-6605 (MFI 5 and MP 130° C.) from Exxon; polypropylene (PP) such as Valtec HS-005M (MFI 2), Profax ST256M (MFI 2) and Profax SB912 (MFI 6) from Indelpro; ethylene-propylene (EP) copolymers such as Hifax CA 1132 A (MFI 2 and MP 162° C.) from Lyondell Basell or Buna EP G 2050 from Lanxess.

The content of this second type of resins within the formulation is from about 5 to about 95 phr, preferably from about 10 to about 90 phr, using either one or several of them in combination.

With regard to the compatibilizing and/or coupling agents used for eliminating the compatibility problem of some of the polyolefins with the mineral fillers that are added and even among them, a third type of polymer resin is used, comprising maleic anhydride (MAg) grafted on high density polyethylene (HDPE), low density polyethylene (LLDPE), polypropylene (PP) or ethylene-propylene (EP) copolymers such as Orevac 18307 (HDPE-MAg, MFI 2.5 and MP 135° C.) from Arkema; Fusabond E608 (LLDPE-MAg, MFI 2 and MP 118° C.) from Dupont; Orevac CA 100 (PP-MAg, MFI 10 and MP 167° C.) from DuPont; Buna EP XT 2708 VP (EP-MAg and MFI 8) from Lanxess; as well as, polyethylene-acrylic acid (EAA) copolymers such as Escor 5000 (MFI 8.2) from Exxon Chemical.

The content of this third type of resins within the formulation is from about 0.2 to about 50 phr, preferably from about 5 to about 40 phr.

On the other hand, the compatibility between resins and flame retardant fillers can also be enhanced using silane-type chemical additives such as Silquest A172 and A1100 from OSI Specialties or AMEO 3 from Degussa; zirconates and titanates such as the ones registered under trademark Tyzor from DuPont, titanates sold under the trademark Ken React from Kenrich Petrochemicals, or zirconates sold under the trademark Vertec from Jhonson Matthey.

The content of this type of additives in the formulation is from about 0.2 to about 5, preferably from about 1 to about 3 phr.

Because the polyolefin-based compounds are materials with no resistance to flame propagation, it is necessary to incorporate to the formulation flame retardant elements and so it is necessary to add large quantities of mineral fillers (above 100 phr) in the composition, that supply precisely this flame retarding characteristic in order to obtain Oxygen Index (OI) above 32% and to prevent dripping during combustion and thus flame propagation to nearby objects.

As flame retardant elements, mineral fillers based on metal hydroxides, combinations of calcium carbonate and metal hydroxides, as well as, mixtures of nitrogen and phosphorus flame retardant are mainly used.

In the case of the metal hydroxides, micrometric or nanometric particle sizes are used, as well as, combinations thereof, alumina trihydrate (ATH) having decomposition temperatures ranging from 180° C. to 200° C. and magnesium hydroxide (MDH) having decomposition temperatures around 300° C. are mainly used. The ATH used are Apyral 60 D and Apyral 40 CD from Nabaltec, Micral 1500 from Huber, as well as, ATH from Nanostructured and Amorphous Materials Inc. The MDH used is Hydrofy NG 2.5 from Nuova Sima, Hidromag FR45 from Petioles, MDH from Nanostructured and Amorphous Materials Inc.

It is important to state that in a specific embodiment of the present invention, the coupling agent is part of the surface treatment of the mineral filler, as in the case of the MDH incorporating surface treatments based on fatty acids, titanates, zirconates, silanes and polymer systems to enhance the compatibility between the polymer matrix and the mineral filler, such as Vertex from Huber in its versions SV100, SP100 and ST1; and Magnifin series A, H, IV, MV and GH/HV from Albemarle.

The content of the metal hydroxides, both aluminum, as well as, magnesium, within the formulation is from about 120 to about 250 phr, preferably from about 150 to about 220 phr. If a combination of micrometric and nanometric size hydroxide particles is used, the total content of the filler is reduced, preferably from about 120 to about 180 phr. If the polyolefin-based resin is predominantly polyethylene, any of the hydroxides can be used either alone or in combination; however, if the resin is mostly polypropylene, it is recommended to use only magnesium hydroxide.

On the other hand, in order to obtain a compound having flame resistance properties similar to the ones already mentioned (OI>32%) and mineral filler levels below 130 phr, a combination of calcium carbonate from about 10 to about 60 phr, preferably from about 20 to about 50 phr and magnesium hydroxide from about 30 to about 80 phr, preferably from about 40 to about 70 phr is used. In this embodiment, the total level of the mineral filler should be from about 80 to about 130 phr and the calcium carbonate content should be equal to, or lower than, the magnesium hydroxide content. Together with the filler combination, it is necessary to use silicon compounds from about 5 to about 20 phr, preferably from about 8 to about 15 phr, as well as EVA, EBA, EEA, EMA or EAA type polymer resins such as the ones described above, from about 20 to about 60 phr, preferably from about 30 to about 50 phr, of the 100 phr of resin.

Alternative to the metal hydroxides, flame retardant based on mixtures of nitrogen and phosphorus can be used, that, at levels below 100 phr, give the polyolefins, oxygen index values above 32% and excellent performance with regard to flame tests. Commercial options of these materials are used such as FP-2100J from Adeka or Budit 3467 from Budenheim. The recommended levels of use are from about 40 to about 100 phr, preferably from about 50 to about 80 phr. If larger quantities are used, problems will appear during water immersion electrical tests.

On the other hand, the technical and scientific literature relates extensively to the flame resistance properties granted by some materials at nanometric particle size upon being combined with other types of flame retardant materials at micrometric and/or nanometric particle size, such as metal hydroxide and amino-phosphate systems, among others.

In the formulations of the present invention, montmorillonite-type nanometric clays (nanoclays) were used, at concentrations ranging from about 1 to about 20 phr, preferably from about 5 to about 15 phr, to enhance flame resistance properties.

The tested clays were Cloisite 20 A from Southern Clay Products, Nanocor 128E from Nanocor and Nanofil SE3000 from Süd-Chemie. The results obtained during the tests permitted the use of minor concentrations of traditional flame retardants improving thus the flow properties of the compounds.

On the other hand, one of the weak points of the polyolefins is their tendency to degrade through oxidation. Some of them such as polypropylene are more susceptible to suffer this type of degradation and thus materials have been developed that solve this problem, through the use of various types of antioxidants acting in different ways. Said materials have been generically classified as primary, secondary, metal deactivators and dual (the ones combining two types of functions) antioxidant agents.

The problem to be solved comprises finding the best combination of the different types of antioxidant agents in order to fulfill the requested short and long term characteristics. Specifically, in the short term, the oxidation of the polymer material during the compounding and cable extrusion processes must be avoided; and the material should be protected in the long run in order to fulfill a minimum life expectancy that is evaluated through oven aging processes established by the standards for this type of application.

It is well known that the polyolefins main degradation mechanism is an oxidation reaction caused by the combination of heat and oxygen. This reaction causes the appearance of carbonyl groups in its structure and the rupture of the polymer chains with the corresponding reduction of mechanical and electrical properties.

The selection of the antioxidant agent depends on the polymer or polymer mixture chosen. Because it is critical for thermal stability properties, various alternatives have been proposed. Good results have been obtained with phenol-type oxidant agents such as Anox 20 (Tetrakismethylene (3,5-di-terbutyl-4-hydroxycinnamate) methane) and Anox 330 (1,3,5-trimethyl-2,4,6-tri(3,5-di-terbutyl-4-hydroxybencyl)benzene) from Chemtura, Hostanox O10P (Tetrakis(methylen-3-(3,5-di-terbutyl-4-hydroxyphenyl)propionate)methane) from Clariant, Sumilizer GA 80 (3,9-Bis[2-[3-(3-tert-butyl-4-hydroxy-5-methylphenyl)-propionyloxy]-1,1-dimethylethyl]-2,4,8,10-tetraoxaspyro-[5.5]undecane) from Sumitomo; aromatic amine-type such as Naugard 445 (4,3-bis (alpha, alpha-dimethylbenzyl)diphenylamine) and Naugard Q (1,2-dihydro-2,2,4-trimethylquinoline) from Chemtura, Vanox ZMTI (Zinc 2-mercaptotoluimidazol) from Vanderbilt; phenol-amine type such as Lowinox MD 24 (1,2-bis(3,5-di-ter-butyl-4-hydroxyhydrocinnamoyl)hydrazine) from Chemtura; thioesther type such as Irganox 1035 (Tiodiethylenebis(3-(3-5-di-ter-butyl-4-hydroxyphenyl)propionate)) from Ciba and Sumilizer TPM (Dimyristil 3,3-tiodipropionate) from Sumitomo; organophosphate type such as Songnox 6180 (Distearylpentaerythritoldiphosfite) and Sognox 6260 (Bis(2,4-di-tert-butylphenyl)pentaerythritoldiphosphite) from Vanderbilt; and, metallic deactivating agents such as CDA-1 (3-(N-salyciloil)amine-1,2,3-triazole) from Amfine.

The antioxidant agent content in the formulation ranges from about 0.1 to about 15 phr, preferably from about 0.2 to about 8 phr; one or several such agents can be used in combination depending on the polymer mixture used.

Moreover, the high mineral filler contents added to the polyolefin-based compounds generate high viscosity melted compound and thus its processing becomes difficult. In order to reduce this effect, it is necessary to use lubricating agents that reduce the friction between the compound and the walls of the processing equipment, as well as within the compound itself as a consequence of the flow. Moreover, a good lubrication of the compound enhances thermal stability because it reduces the heat generated by the friction between the process equipment and the compound.

In order to obtain a good processability, several lubricant systems were used, both internal as well as external ones alone or in combination of two or more of them. Within the lubricants, polyethylene waxes were used such as AC-617 from Honeywell and calcium stearate such as Demolub C-105 from Demosa. With regard to external lubricants, oxidized polyethylene waxes such as AC-629A wax from Honeywell; high molecular weight silicon oils such as AK-1000; polysiloxanes such as polydimethyl siloxane sold under trademark Genioplast S, both from Wacker; or modified silicon resin 4-7051 and 4-7081 from Dow Corning were used. In the case of the last three, it has been evidenced that besides enhancing the processability of the compounds, they also offer the polyolefins some flame resistance properties. The external lubricants can be used alone or in combination of two or more of them.

The lubricants content in the formulation ranges from about 0.2 to about 5 phr, depending on their effectiveness and they can be used alone or in combination of two or more of them, depending on the desired processability.

FIGS. 1 to 4 show a length of two different embodiments of a low voltage electrical conductor 1. The conductor cable 1 is made of a conductor core and at least one insulating layer.

The conductor core 2 includes at least an electrical conductor wire, either a solid monofilament electrical conductor wire or a multifilament electrical conductor wire comprising several wires 3, as shown in FIGS. 1 to 4. The material used for manufacturing the electrical conductor cable can be soft copper, soft or hard aluminum, copper coated aluminum or copper coated steel.

Figure 2:
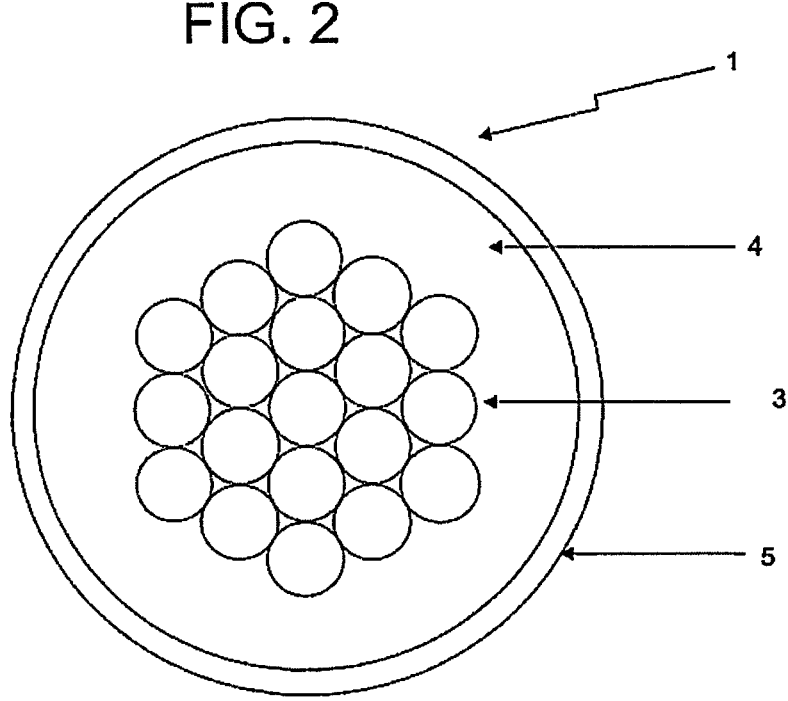
FIG. 2 is a cross-section front view of the electrical conductor cable shown in FIG. 1.

In the embodiment shown in FIGS. 1 and 2, the conductor cable 1 includes two insulating layers 4 and 5, a first insulating layer 4 wrapped around the whole length of the conductor core 2; and a second insulating layer 5 wrapped around the whole length of the first insulating layer 4. The insulating layers of the conductor cable shown in FIGS. 1 and 2 are manufactured with the composition for manufacturing halogen-free thermoplastic insulations of the present invention and thus are flame retardant, and show low emission of black smoke in case of fire and good electrical properties in water immersion tests.

Figure 3:
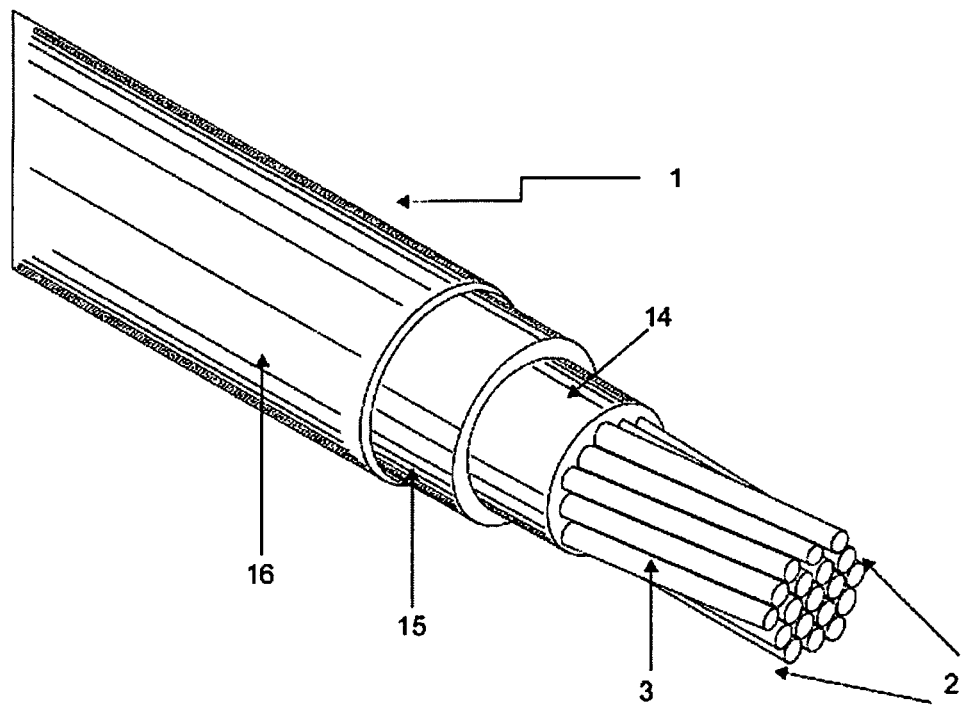
FIG. 3 is a perspective view of a segment of a low voltage electrical cable with triple insulation layer, manufactured with the composition of the present invention, which includes a cross-section to show the structural details of the cable.
Figure 4:
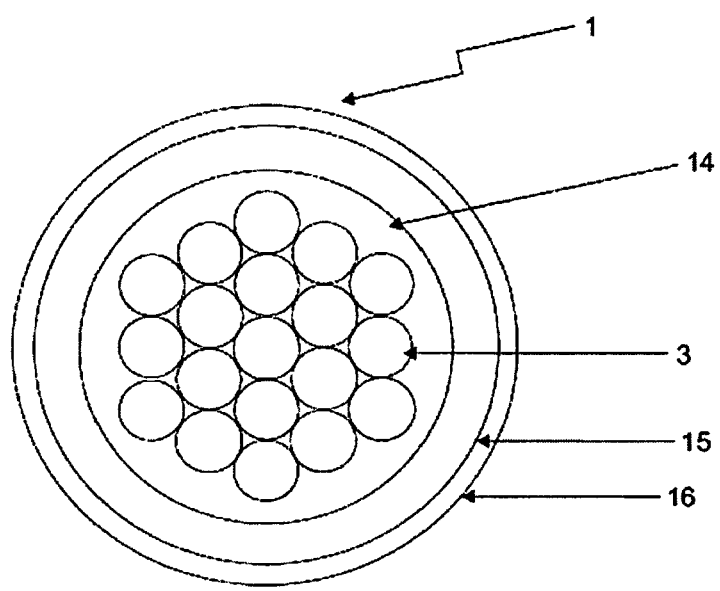
FIG. 4 is a cross-section front view of the electrical conductor cable shown in FIG. 3.

With regard to the embodiment shown in FIGS. 3 and 4, the conductor cable 1 includes three insulating layers 14, 15 and 16, respectively. A first insulating layer 14 totally wraps the whole length of the conductor core 2; a second insulating layer 15 completely wraps the whole length of the first insulating layer 14; and a third insulating layer 16 completely wraps the whole length of the second insulating layer 15. The insulating layers of the conductor cable shown in FIGS. 3 and 4 are made with the composition for manufacturing halogen-free thermoplastic insulations of the present invention and thus are flame retardant, and show low emission of black smokes in case of fire and good electrical properties in water immersion tests.

It is important to state that from the second insulating layer, the requested layers may be manufactured in different colors and will be based on the compound of the first layer. If the cable should show resistance to sunlight and the environment, additives have to be added that protect the compound against UV light (UV protectors), oxygen and moisture, agents causing the loss of mechanical properties and color changes that derive in product defects.

In order to avoid said undesirable effects, titanium dioxide such as T-Pure R-900 and R-902+ from DuPont; carbon black such as Elftex TP and Vulcan 9A32 from Cabot; benzophenone such as Lowilite 20 and 22 from Chemtura; benzotriazole such as 100977 and 100325 from Ampacetor Lowilite 234 from Chemtura are added as UV protectors. If higher resistance in long term tests is desired, hindered amine light stabilizers (HALS) such as BLS 1770 and BLS-1944 from Mayzo, Lowilite 19 from Chemtura or 100600 and 100654 from Ampacet must be added as UV protectors.

The UV protecting agents are added to the composition alone or in combination, in concentrations ranging from about 0.01 to about 5.0 phr, preferably from about 0.1 to about 4.0 phr.

Owing to the good insulating properties of the polymer compounds obtained with the composition of the present invention, flame retardant, halogen-free thermoplastic insulations having the structure shown in FIGS. 1 to 4 were manufactured for electrical conductors. Said insulations also show low emission of smoke in case of fire and good electrical properties in water immersion test.

It is important to take into account that with the composition of the present invention it is possible to reduce insulation thicknesses by as much as 50% of the values defined in NMX-J-010 Standard for THW-LS/THHW-LS cables that are insulated with PVC compounds.

Exception with regard to the insulating compound thicknesses, the cable obtained with the composition of the present invention meets all the tests requirements defined in Mexican Standard NMX-J-010 for a THW-LS/THHW-LS type cable, which represents an improvement in the cable performance, the main characteristics of which are:

a) Halogen and heavy metal free thermoplastic insulation compounds.
b) Thermal service class from −40° C. to 105° C.
c) Low water absorption determined by the NMX-J-040 electrical method at up to 90° C. (capacitance and relative permittivity at 90° C. according to UL-1581).
d) Very low emission of halogenated acid gas (below 0.1% by weight, NMX-J-472).
e) Very low emission of smoke (NMX-J-474).
f) Weather resistance (NMX-J-553).
g) It fulfills the European Directive RoHS (2002/95/CE).
h) High flame resistance and high fire propagation resistance. (NMX-J-083 and NMX-J-498).

The process for manufacturing an electrical conductor cable that uses the composition for manufacturing halogen-free thermoplastic insulations according to the present invention comprises the following stages:

1. Prepare a conductor core based on soft copper, aluminum, copper coated aluminum or copper coated steel; may be a solid monofilament or multifilament made up by several wires, preferably from about 7 to about 61 cabled wires, meeting all the requirements mentioned in Mexican Standard NMX-J-036.
2. Extrude a first layer of insulating material directly on the electrical conductor, using the formulation of a thermoplastic compound of the present invention, showing its natural color or pigmented. The insulation agent obtained has an oxygen index value no lower than 32% and gives the electrical conductor high flame resistance and high resistance to fire propagation, very low emission of black smoke and very low emission of toxic gases, as well as, good electrical properties, even in conditions of water immersion during several days. This first layer of insulating material can represent from about 20% to about 100% of the total of the insulating material applied onto the electrical conductor.
3. Extrude on the first insulating layer, if required, a second insulating layer, using the thermoplastic compound formulation of the present invention. This second layer has a thickness that can represent up to about 50% of the total thickness and can be pigmented or not in order to give the final color appearance to the product. Moreover it gives the cable high sliding properties, weather resistance and enhanced fire resistance.
4. If additional insulating layers are required, the above stage can be repeated as many times as necessary.

Because of the good insulating properties of the thermoplastic compounds obtained with the composition of the present invention used in the manufacturing of the electrical conductor according to the abovementioned detailed description, it is possible to reduce the insulation thicknesses by up to about 50% compared to the values defined in NMX-J-010 Standard.

For example, a 14 AWG cable requiring 0.76 mm (30 mils) of total insulation thickness when PVC is used, only requires a total insulation thickness of 0.38 mm (15 mils) with these new compounds, and the electrical conductor manufactured in this way meets the test requirements defined in NMX-J-010 Standard.

In Table 1, the results obtained upon submitting the cable insulated with the composition for manufacturing halogen-free thermoplastic insulations of the present invention for low voltage electrical conductors are shown.

TABLE 1

| TEST | METHOD | SPECIFIED ACCORDING TO NMXJ-010 FOR THW-LS/THHW-LS CABLE | TYPICAL VALUE |
|---|---|---|---|
| Initial tensile strength (MPa) | NMX-J-178 | Min. 6.8 | 10.0 |
| Elongation at break (%) | NMX-J-178 | Min. 100 | 300 |
| Cold bend-40° C./4 h | NMX-J-193 | Not show any cracks | COMPLIES |
| Heat deformation at 136° C. (%) | NMX-J-191 | Max. 30 | 10 |
| Thermal shock 121° C./1 h | NMX-J-190 | Not show any cracks | COMPLIES |
| Flexibility 136° C./168 h | NMX-J-189 | Not show any cracks | COMPLIES |
| Fire Propagation RPI (m) | NMX-J-093 | Max. 0.80 | 0.20 |
| Vertical Flame FV1 | NMX-J-192 | Comply | COMPLIES |
| AIR OVEN AGING 136° C./168 h | | | |
| Strength retention (%) | NMX-J-178 | Min. 75 | 120 |
| Elongation retention (%) | NMX-J-178 | Min. 65 | 90 |
| REDUCED EMISSION OF SMOKE | | | |
| Maximum Density (Dm) | NMX-J-474 | Max. 500 | 100 |
| $VOF_4$ | NMX-J-474 | Max. 400 | 15 |
| Halogen acid gas emission (% HCl) | NMX-J-472 | Max. 20 | <0.1 |
| Insulation Resistance (MΩ km) | NMX-J-040 | Min. 175 | 1500 |
| WATER ABSORPTION - ELECTRIC METHOD | | | |
| Dielectric constant | NMXJ-040 | Max. 10 | 3.5 |
| Capacitance increase from 7 to 14 days (%) | NMXJ-040 | Max. 5 | 2.2 |
| Capacitance increase from 1 to 14 days (%) | NMXJ-040 | Max. 10 | 5.0 |

Besides complying with the above described tests, the electrical conductor obtained fulfills the following special tests and so can be marked with the legends indicated hereinafter in Table 2.

TABLE 2

| TEST | STANDARD NMX-J-010 PART | MARKED |
|---|---|---|
| Oil resistance | 5.14.1 | PR I and PR II |
| Gasoline resistance | 5.15 | GR I and GR II |
| Flame resistance | 5.12.2 | VW-1 |
| Resistance to fire propagation in vertical tray | 5.12.4 | CT FT4 |
| Weather Resistance | 5.13 | SR |
| Limited smoke in vertical tray | 5.12.6 | ST1 |
| COMBUSTION GASES CORROSION IEC-60754-2 | | |
| Conductivity (μS/mm) Max. 10 | N/A | 4.8 |
| pH Min. 4.3 | N/A | 4.9 |

It is important to state if the above described UV protectors are added to the composition for manufacturing halogen-free thermoplastic insulations according to the present invention and particularly to the composition for manufacturing the insulation external layer, an electrical conductor cable is obtained that complies with the weather resistance test defined in NMX-J-553 Standard.

Since each one of the layers of the insulating material of the electrical conductor is made with the composition for manufacturing halogen-free thermoplastic insulations of the present invention, in which polyolefin-based compounds free from halogen, lead and heavy metals are used, it is possible to obtain an electrical conductor that complies with the ecological guidelines defined by the European Directive RoHS 2002/95/CE, ensuring that the elements and compounds mentioned hereinafter are absent or below the levels stipulated in said directive:

| | |
|---|---|
| Cadmium (Cd) | 100 ppm (0.01%) max. |
| Mercury (Hg) | 1000 ppm (0.10%) max. |
| Lead (Pb) | 1000 ppm (0.10%) max. |
| Hexavalent chromium (Cr VI) | 1000 ppm (0.10%) max. |
| Polybrominated biphenyls (PBB) | 1000 ppm (0.10%) max. |
| Polybrominated diphenyl ether (PBDE) | 1000 ppm (0.10%) max. |

The fulfillment of the directive RoHS 2002/95/CE ensures that this cable is a safe and environmental friendly product during its manufacturing, manipulation during the installation process, life and disposal after use.

Although the above description has been made with regard to preferred embodiments of the present invention, numerous modifications are possible without leaving the true scope of the present invention, such as modifications regarding ratios between the components integrating the composition for manufacturing halogen-free thermoplastic insulations, flame retardant, low smoke emission showing good electrical properties in water, for low voltage electrical conductors described above.

Having described the above invention, what is claimed as new is as follows:

1. A composition for manufacturing halogen-free, flame retardant, low smoke emission, thermoplastic insulations showing good electrical properties in water, comprising: a) a mixture of at least two polyolefin-based polymer resins selected from the group consisting of or optionally, combinations thereof, comprising from about 5 to about 95 phr of a first soft and flexible resin and from about 5 to about 95 phr of a second tensile strength and heat-resistance provider resin; b) from about 0.2 to about 50 phr of at least one compatibilizing and/or coupling agent; c) from about 40 to about 270 phr of at least one flame retardant agent; d) from about 0.1 to about 15 phr of at least one antioxidant agent; and e) from about 0.2 to about 5 phr of at least one lubricant agent;
wherein the second tensile strength and heat resistance provider resin is selected from high density polyethylene-type resins high density polyethylene-type resins (HDPE); polypropylene-type resins (PP); ethylene-propylene copolymer-type resins (EP); or combinations thereof; said composition providing good electrical performance of insulation even after long term water immersion as shown by the water absorption electric method (EMA test) according to NMX-J-040 and UL-2556 (capacitance and relative permittivity); mechanical performance and flame test compliance.

2. The composition for manufacturing halogen-free, flame retardant, low smoke emission, thermoplastic insulations showing good electrical properties in water according to claim 1, wherein the flame retardant agent incorporates a flame retardant mineral filler.

3. The composition for manufacturing halogen-free, flame retardant, low smoke emission, thermoplastic insulations showing good electrical properties in water, according to claim 2, wherein flame retardant mineral fillers are used that are based on metal hydroxides or combinations of calcium carbonate and metal hydroxides.

4. The composition for manufacturing halogen-free, flame retardant, low smoke emission, thermoplastic insulations showing good electrical properties in water, according to claim 3, wherein the flame retardant mineral filler is selected from metal hydroxide or combinations thereof, in micrometric or nanometric sized particles, in a range selected from a group consisting of about 120 to about 250 phr or 150 to about 220 phr.

5. The composition for manufacturing halogen-free, flame retardant, low smoke emission, thermoplastic insulations showing good electrical properties in water, according to claim 3, wherein the metal hydroxide-based mineral filler is selected from alumina trihydrate (ATH) or magnesium hydroxide (MDH).

6. The composition for manufacturing halogen-free, flame retardant, low smoke emission, thermoplastic insulations showing good electrical properties in water, according to claim 5, wherein the MDH incorporates surface treatments based on fatty acids, titanates, zirconates, silanes and polymer systems for improving the compatibility between the polymer matrix and the mineral filler.

7. The composition for manufacturing halogen-free, flame retardant, low smoke emission, thermoplastic insulations showing good electrical properties in water, according to claim 3, further comprising a composition with levels of flame retardant mineral filler of from about 80 phr and about 130 phr; or mixtures of from a group consisting of about 10 phr to about 60 phr or 20 phr to about 50 phr of calcium carbonate and from about 30 phr to about 80 phr of magnesium hydroxide; wherein the calcium carbonate content should be equal to, or lower than, the magnesium hydroxide content.

8. The composition for manufacturing halogen-free, flame retardant, low smoke emission, thermoplastic insulations showing good electrical properties in water, according to claim 7, further comprising a combination with silicon compounds.

9. The composition for manufacturing halogen-free, flame retardant, low smoke emission, thermoplastic insulations showing good electrical properties in water, according to claim 8, wherein the amount of silicon compounds is selected from a group consisting of about 5 to about 20 phr or from about 8 to about 15 phr, wherein out of the 100 phr of resin; at least a resin selected from EVA, EBA, EEA, EMA or EAA type resins are in the amount selected from a group consisting of about 20 to about 80 phr or from about 30 to about 50 phr.

10. The composition for manufacturing halogen-free, flame retardant, low smoke emission, thermoplastic insulations showing good electrical properties in water, according to claim 1, wherein the mixture of at least two polyolefin-based polymer resins comprises from about 10 to about 90 phr of the first soft and flexible resin; and from about 10 to about 90 phr of the second tensile strength and heat-resistance provider resin.

11. The composition for manufacturing halogen-free, flame retardant, low smoke emission, thermoplastic insulations showing good electrical properties in water, according to claim 10, wherein the first soft and flexible resin is selected from polyethylene vinyl acetate-type resins (EVA); polyethylene butyl acrylate-type resins (EBA); polyethylene ethyl acrylate-type resins (EEA); polyethylene methyl acrylate-type resins (EMA); low density lineal polyethylene-type resins (LLDPE); ethylene propylene copolymer-type resins (EP); or copolymers type resin that can include α olefins having the general formula $CH_2=CH-R$, wherein R is an alkyl, alkenyl or alkynyl which can contain from 1 to 10 carbons, that can be copolymerized or mixed among them; and combinations thereof.

12. The composition for manufacturing halogen-free, flame retardant, low smoke emission, thermoplastic insulations showing good electrical properties in water, according to claim 1, wherein the compatibilizing and/or coupling agent is from about 5 to about 40 phr.

13. The composition for manufacturing halogen-free, flame retardant, low smoke emission, thermoplastic insulations showing good electrical properties in water, according to claim 12, wherein as compatibilizing and/or coupling agent, a third type of polymer resin is used and selected from maleic anhydride (MAg) grafted on high density polyethylene (HDPE), low density polyethylene (LLDPE), polypropylene (PP) or ethylene-propylene (EP) copolymers; or polyethylene-acrylic acid (EAA) resins.

14. The composition for manufacturing halogen-free, flame retardant, low smoke emission, thermoplastic insulations showing good electrical properties in water, according to claim 1, wherein coupling agent is selected from silane-type chemical additive, zirconate-type or titanate-type chemical additives; said amount of coupling agent is selected from a group consisting of between about 0.2 and about 5 phr; or between about 1 and about 3 phr.

15. The composition for manufacturing halogen-free, flame retardant, low smoke emission, thermoplastic insulations showing good electrical properties in water, according to claim 14, wherein the coupling agent is part of the surface treatment of the mineral filler.

16. The composition for manufacturing halogen-free, flame retardant, low smoke emission, thermoplastic insulations showing good electrical properties in water, according to claim 1, further comprising flame retardant mixtures of nitrogen and phosphorus; the amount of which is selected from a group consisting of about 40 to about 100 phr or from about 50 to about 80 phr.

17. The composition for manufacturing halogen-free, flame retardant, low smoke emission, thermoplastic insulations showing good electrical properties in water, according to claim 1, further comprising nanometric clays for enhancing fire resistance properties.

18. The composition for manufacturing halogen-free, flame retardant, low smoke emission, thermoplastic insulations showing good electrical properties in water, according to claim 17 wherein the clays are montmorillonite-type nanoclays in concentration ranges are selected from a group consisting of about 1 to about 20 phr or 5 to about 15 phr.

19. The composition for manufacturing halogen-free, flame retardant, low smoke emission, thermoplastic insulations showing good electrical properties in water, according to claim 1, further comprising antioxidant agents or combinations thereof, in a range of from about 0.2 to about 8 phr.

20. The composition for manufacturing halogen-free, flame retardant, low smoke emission, thermoplastic insulations showing good electrical properties in water, according to claim 19, wherein the antioxidant agent is selected from a) phenol-type antioxidants; b) aromatic amine-type antioxidants; c) phenol amine-type antioxidants, d) thioester-type antioxidants; e) organophosphate-type antioxidants; or f) metal deactivators-type antioxidants.

21. The composition for manufacturing halogen-free, flame retardant, low smoke emission, thermoplastic insulations showing good electrical properties in water, according to claim 1, wherein the lubricant agent is selected from internal lubricants, external lubricants or combinations of two or more thereof.

22. The composition for manufacturing halogen-free, flame retardant, low smoke emission, thermoplastic insulations showing good electrical properties in water, according to claim 21, wherein the internal lubricant is selected from polyethylene waxes or calcium stearate.

23. The composition for manufacturing halogen-free, flame retardant, low smoke emission, thermoplastic insulations showing good electrical properties in water, according to claim 21, wherein the external lubricant is selected from oxidized polyethylene waxes; high molecular weight silicon oils; polysiloxanes; silicon resins or combination thereof.

24. The composition for manufacturing halogen-free, flame retardant, low smoke emission, thermoplastic insulations showing good electrical properties in water, according to claim 1, further comprising UV protectors in a range selected from a group consisting of from about 0.01 to about 5.0 phr or 0.1 to about 4.0 phr to provide a solar light resistant and environment resistant insulation composition.

25. The composition for manufacturing halogen-free, flame retardant, low smoke emission, thermoplastic insulations showing good electrical properties in water, according to claim 24, wherein the UV protector is selected from titanium dioxide-type protectors; carbon black-type protectors; benzophenone-type protectors; benzotriazole-type protectors; or hindered amine-light stabilizers (HALS) type protectors.

26. A composition for manufacturing halogen-free, flame retardant, low smoke emission, thermoplastic insulations showing good electrical properties in water according to claim 1, comprising:
  a) a mixture of at least two polyolefin-based polymer resins or optionally, combinations thereof, comprising from about 5 to about 95 phr of a first soft and flexible resin and from about 5 to about 95 phr of a second tensile strength and heat-resistance provider resin;
  b) from about 0.2 to about 50 phr of at least one compatibilizing and/or coupling agent;
  c) from about 40 to about 270 phr of at least one flame retardant agent;
  d) from about 0.1 to about 15 phr of at least one antioxidant agent; and
  e) from about 0.2 to about 5 phr of at least one lubricant agent;
  wherein said polyolefin based polymer resins comprises from about 10 to about 90 phr of the first soft and flexible resin; and from about 10 to about 90 phr of the second tensile strength and heat-resistance provider resin; the first soft and flexible resin is selected from polyethylene vinyl acetate-type resins (EVA); polyethylene butyl acrylate-type resins (EBA); polyethylene ethyl acrylate-type resins (EEA); polyethylene methyl acrylate-type resins (EMA); low density lineal polyethylene-type resins (LLDPE); ethylene propylene copolymer-type resins (EP); or copolymers type resin that can include a olefins having the general formula $CH_2=CH-R$, wherein R is an alkyl, alkenyl or alkynyl which can contain from 1 to 10 carbons, that can be copolymerized or mixed among them; and combinations thereof;
  said composition providing good electrical performance of insulation even after long term water immersion as shown by the water absorption electric method (EMA test) according to NMX-J-040 and UL-2556 (capacitance and relative permittivity); mechanical performance and flame test compliance.

27. An electrical conductor cable comprising:
  a) a conductor core comprising an electrical conductor wire;
  b) a first insulating layer wrapped around the whole length of the conductor core; said insulating layer comprising:
    i) a mixture of at least two polyolefin-based polymer resins or optionally combinations thereof, comprising from about 5 to about 95 phr of a first soft and flexible resin and from about 5 to about 95 phr of a second tensile strength and heat-resistance provider resin; ii) from about 0.2 to about 50 phr of at least one compatibilizing and/or coupling agent; iii) from about 40 to about 270 phr of at least one flame retardant agent; iv) from about 0.1 to about 15 phr of at least one antioxidant agent; and v) from about 0.2 to about 5 phr of at least one lubricant agent;

c) a second insulating layer wrapped around the whole length of the first insulating layer;

d) a third insulating layer wrapped around the whole length of the third insulating layer; said second and third insulating layer comprising similar components as the first insulating layer; wherein said conductor comprises halogen-free, flame retardant, low smoke emission, thermoplastic insulations showing good electrical properties in water;

said conductor providing good electrical performance of insulation even after long term water immersion as shown by the water absorption electric method (EMA test) according to NMX-J-040 and UL-2556 (capacitance and relative permittivity); mechanical performance and flame test compliance.

28. The electrical conductor according to claim 27 wherein the electric conductor wire is selected from soft copper, soft or hard aluminum, copper coated aluminum or copper coated steel.

29. The electrical conductor according to claim 27 wherein the electric conductor wire is selected from monofilament electric conductor wire or multifilament electric conductor wire.

30. The electrical conductor according to claim 27 wherein the first insulating layer can represent at least 20 to 100% of the total insulating material.

31. The electrical conductor according to claim 27 wherein the insulation has an oxygen index of no lower than 32%.

32. The electrical conductor according to claim 27 wherein the second insulating layer has a thickness that represents up to 50% of the total thickness and may comprise pigments to provide color appearance to the final product.

33. A composition for manufacturing halogen-free, flame retardant, low smoke emission, thermoplastic insulations showing good electrical properties in water, comprising:

a) a mixture of at least two polyolefin-based polymer resins or optionally, combinations thereof, comprising from about 5 to about 95 phr of a first soft and flexible resin and from about 5 to about 95 phr of a second tensile strength and heat-resistance provider resin;

b) from about 0.2 to about 50 phr of at least one compatibilizing and/or coupling agent; wherein the coupling agent is part of the surface treatment of the flame retardant mineral filler;

c) from about 40 to about 270 phr of at least one flame retardant agent which incorporates a flame retardant mineral filler;

d) from about 0.1 to about 15 phr of at least one antioxidant agent; and e) from about 0.2 to about 5 phr of at least one lubricant agent;

wherein said polyolefin based polymer resins comprises from about 10 to about 90 phr of the first soft and flexible resin; and from about 10 to about 90 phr of the second tensile strength and heat-resistance provider resin;

the first soft and flexible resin is selected from polyethylene vinyl acetate-type resins (EVA); polyethylene butyl acrylate-type resins (EBA); polyethylene ethyl acrylate-type resins (EEA); polyethylene methyl acrylate-type resins (EMA); low density lineal polyethylene-type resins (LLDPE); ethylene propylene copolymer-type resins (EP); or copolymers type resin that can include a olefins having the general formula $CH_2=CH-R$, wherein R is an alkyl, alkenyl or alkynyl which can contain from 1 to 10 carbons, that can be copolymerized or mixed among them; and combinations thereof;

the second tensile strength and heat resistance provider resin is selected from high density polyethylene-type resins high density polyethylene-type resins (HDPE); polypropylene-type resins (PP); ethylene-propylene copolymer-type resins (EP); or combinations thereof;

said composition providing good electrical performance of insulation even after long term water immersion as shown by the water absorption electric method (EMA test) according to NMX-J-040 and UL-2556 (capacitance and relative permittivity); mechanical performance and flame test compliance.

* * * * *